J. F. WALSH.
DISPENSING MACHINE.
APPLICATION FILED MAR. 6, 1920.

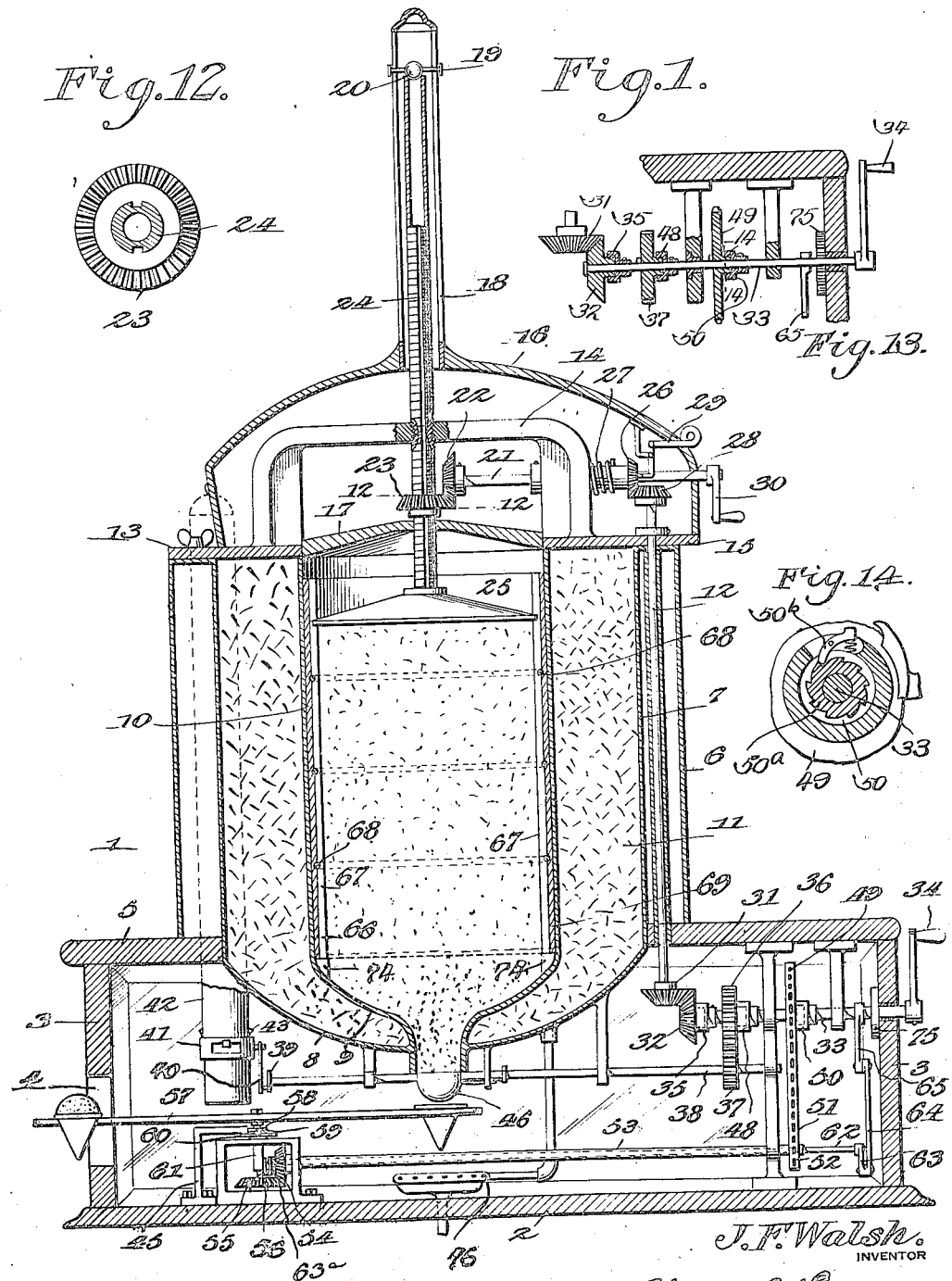

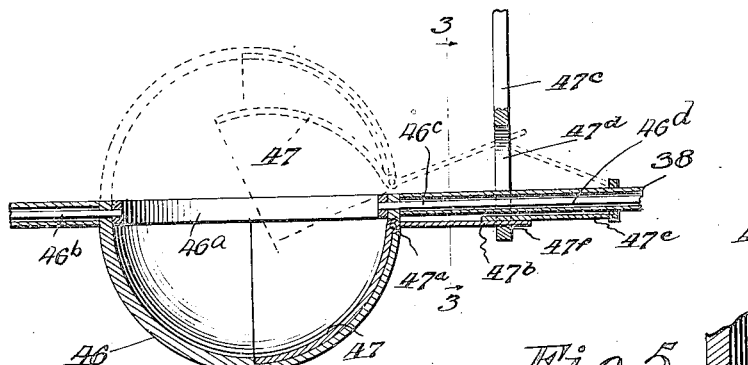
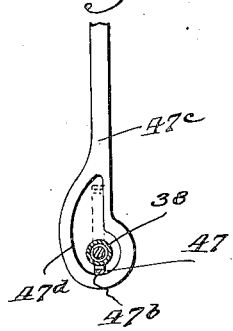
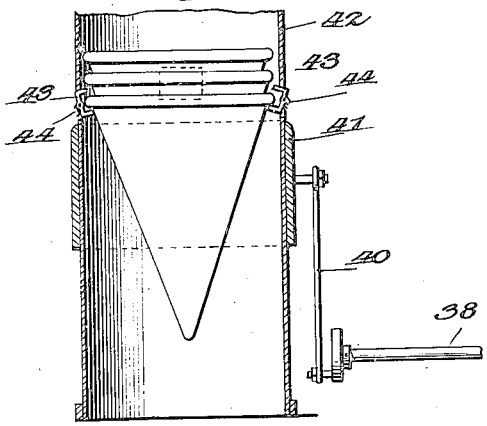
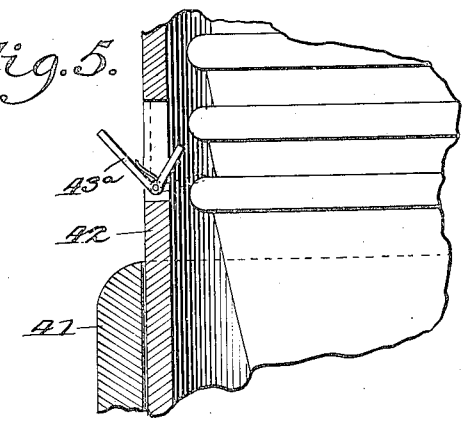
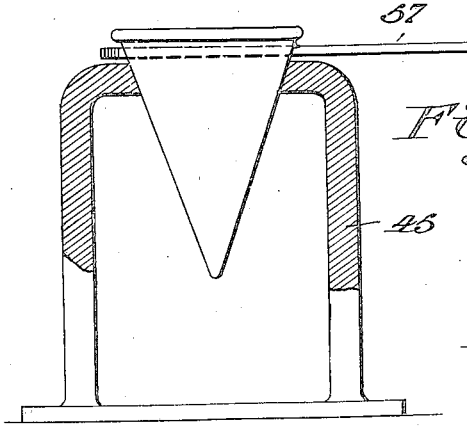
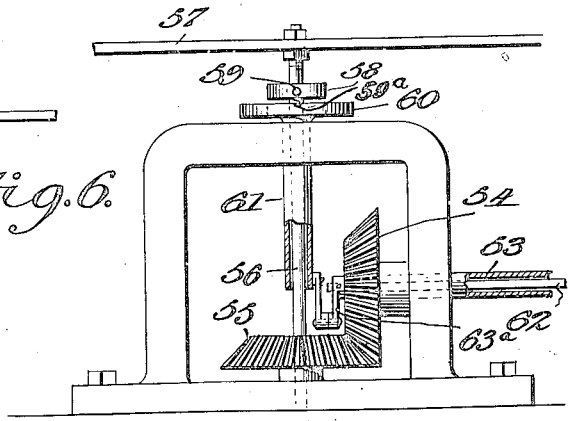

1,412,727.

Patented Apr. 11, 1922.
3 SHEETS—SHEET 3.

J. F. Walsh,
INVENTOR

BY Victor J. Evans
ATTORNEY

UNITED STATES PATENT OFFICE.

JOHN F. WALSH, OF NEWARK, NEW JERSEY.

DISPENSING MACHINE.

1,412,727.  Specification of Letters Patent.  Patented Apr. 11, 1922.

Application filed March 6, 1920. Serial No. 363,796.

*To all whom it may concern:*

Be it known that I, JOHN F. WALSH, a citizen of the United States, residing at Newark, in the county of Essex and State of New Jersey, have invented new and useful Improvements in Dispensing Machines, of which the following is a specification.

This invention relates to improvements in ice-cream dispensing and cone filling machines and has for its principal object to provide a device for delivering a predetermined quantity of ice-cream in a cone and swinging the cone into delivery position from which the same may be removed by the consumer.

Another object of the invention is to provide a container for ice-cream which may be provided with any desired cooling means and is formed with insulating walls in order to prevent the ice-cream from melting and to retain the same in perfect condition.

Another object of the invention resides in the provision of a cone supporting means for holding a cone in such a manner as to be readily placed in delivery position and to provide means for feeding a single cone from a cone dispenser into the delivery mechanism automatically.

A still further object of the invention is to provide the ice-cream containing chamber or receptacle with scrapers which operate against the side-walls thereof and in conjunction with a plunger in such a manner as to cause a uniform amount of ice-cream to be placed into the delivery scoop and to provide for the scraping of the scoop when the same is moved to a discharge position.

Another object of the invention contemplates the provision of a device which may be operated by a crank so as to move the ice-cream scoop to a discharging position and at the same time to eject or discharge the ice-cream within the scoop therefrom.

Another object of the invention contemplates the provision of a means for conducting water of condensation away through a suitable drain which is also designed to receive the water from ice when the device is cooled by such a medium.

With the above and other objects in view, the invention consists of the novel construction, combination and arrangement of parts as will be fully set forth in the following specification, claimed, and illustrated in the accompanying drawings, in which :—

Figure 1 is a vertical sectional elevation of the device embodying the present invention.

Figure 2 is a sectional view of the scoop and correlated parts.

Figure 3 is a sectional view taken on the line 3—3 of Figure 2, looking in the direction as indicated by the arrow.

Figures 4 and 5 are detail views of the cone releasing mechanism.

Figure 6 is a detail view of the cone support.

Figure 7 is a detail view of the means for moving the cone delivering arms.

Figure 12 is a detail sectional view taken on the line 12—12 of Figure 1.

Figure 13 is a detail sectional view taken on Figure 1.

Figure 14 is a detail sectional view taken on the line 14—14, Figure 13.

Figure 8:
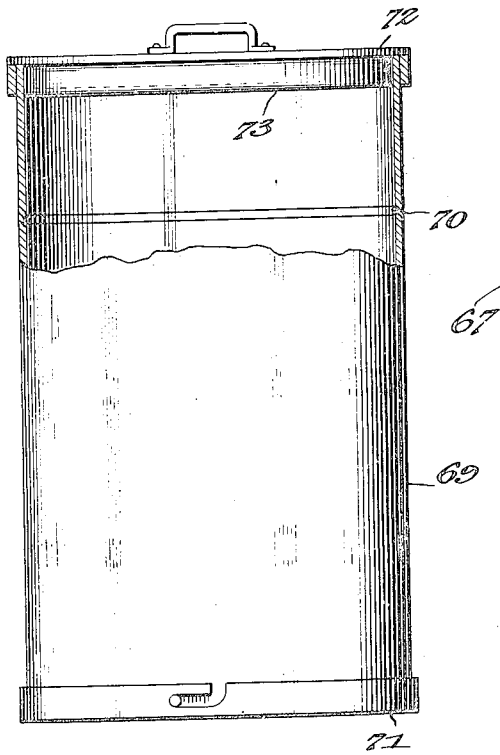
Figures 8 and 9 are views of the ice-cream tank or cylinder.

Referring to the drawings in detail, the numeral 1 designates in its entirety, a cabinet provided with a bottom wall 2 formed with a drain opening through which the drain pipe of the device is adapted to extend, the side walls 3 of the cabinet are preferably of plate glass but may be of any other suitable material and one wall 3 is provided with a delivery opening 4. Supported on the upper edges of the walls 3 is a top wall 5 formed with an enlarged opening into which the lower end of the ice-cream container extends. Projecting upwardly from the top 5 and adjacent the edge of the opening is a cylinder 6 forming the outer casing of the ice-cream container. The cylinder 6 is so constructed and so arranged as to permit of the employment of a suitable packing of heat insulating material of any preferred substance to preserve the ice-cream. Secured to the inner wall of the cylinder 6 is a metallic cylindrical container 7 provided at its lower end with an inwardly extending inclined flange 8 formed centrally with an opening surrounded by a downwardly extending flange. A similar flange is fitted within the flange on the portion 8 and riveted or otherwise rigidly secured thereto and extending upwardly and outwardly from the last named flange is a substantially funnel shaped wall 9 terminating at its upper end in a cylinder 10 which extends throughout the entire length of the cylinder 7 but is spaced inwardly therefrom to provide a space 11 for the reception of the cooling medium. It will be seen that the space 11 extends downwardly and beneath the funnel shaped wall 9 so that cream within the container or cylinder 10 will be practically completely surrounded by the cooling medium.

Extending vertically through the wall 6 is a shaft 12 for a purpose to be more fully hereinafter described. A cover designated generally by the numeral 13 is provided for the upper end of the cylinder 6 and the ice cream container and comprises an inverted U-shaped yoke 14 to the ends of the arms of which is secured a circular plate 15 which covers and closes the upper end of the space 11. A cap member 16 is attached to the periphery of the plate 15 and completely encloses the yoke and other mechanism contained within the cover. The upper end of the ice cream container is closed by a wall 17 which is substantially concavo-convex and is connected at its periphery with the inner edge of the plate 15. This wall 17 is spaced upwardly from the lower edge of the plate a short distance for a purpose to be hereinafter more fully set forth. The cap 16 is formed centrally with an opening into which the lower end of a tubular housing 18 is secured as will be clearly seen upon reference to the drawings and this housing is provided with diametrically arranged longitudinal slots in which the guide pins 19 of the indicator 20 are slidable.

Rotatably mounted in the yoke 14 is a horizontal shaft 21 to the inner end of which is fixed a bevel pinion 22 which meshes with a bevel pinion 23 arranged horizontally between the yoke and the wall 17. The pinion 23 is provided with inwardly extending lugs for engagement in grooves formed longitudinally in the threaded feed screw 24 which engages internal screw threads formed centrally in the yoke 14 and it will thus be seen that as the pinion 23 is rotated, the feed screw 24 will be elevated or lowered according to the direction of rotation. The lower end of the feed screw is provided with a plunger 25 having formed in its periphery, a plurality of notches for engagement with the upper end of the scraper which will be more fully hereinafter explained and this plunger is of a diameter to snugly fit within the ice cream container. The end of the shaft 21 opposite that to which the pinion 22 is secured has slidably mounted thereon a pinion 26 which is normally forced outwardly by a spring 27 into meshing engagement with a pinion 28 carried at the upper end of the shaft 12. A suitable trip mechanism 29 is adapted to move the pinion 26 against the tension of the spring 27 and away from the pinion 28 at which time a crank 30 may be applied to the outer end of the shaft 21 so that the plunger may be raised or lowered independently of the shaft 12.

Secured to the lower end of the shaft 12 is a bevel pinion 31 which meshes with a bevel pinion 32 mounted on the inner end of the main operating shaft 33, the outer end of which projects through one of the walls 3 of the cabinet 1 and is provided with an operating crank 34 by means of which the device may be operated in its entirety. The pionion 32 is provided with a clutch 35 consisting of a ratchet and a pawl which, when the shaft 33 is operated in a clock wise direction, causes said pinion to rotate but upon return movement of said shaft allows the pinion to remain stationary and in this manner it will be seen the plunger 25 may be advanced by the movement of the operating crank 34 but cannot be withdrawn by said crank.

Mounted on the shaft 33 adjacent the clutch 35 is a gear 36 which meshes with a pinion 37 secured to the end of a shaft 38 which is mounted for rotation beneath the ice cream container. This shaft is provided at the end opposite the pinion 37 with a crank arm 39 to which is connected a connecting rod 40, the upper end of which is attached to a sleeve 41 slidably mounted on the lower end of the cone magazine 42. This magazine has pivoted near its lower end a pair of diametrically arranged pawls 43 provided with fingers at opposite ends which are adapted to engage the cones in a manner illustrated in the drawings. It will thus be seen that as the sleeve 41 moves upwardly, the pawls will be rocked on their pivots so as to release the lowermost cone and cause the uppermost fingers on the pawls to engage the next adjacent cone and support the stack. Upon return movement of the sleeve, it will be evident that the pawls will return to their original positions under the influence of springs 44 and thereby allow the stack to be supported on the lowermost fingers of the pawls. In this manner it will be evident that a single cone will be delivered to the cone support 45 and in position to be picked up by the delivery arm. Simultaneously with the dropping of the cone into the support 45, the scoop 46 is rotated by the shaft 38 and turned into such a position as to permit the delivery of the contents thereof into the cone which is arranged in receiving position. A scraper 46$^a$ is held in fixed relation to the scoop 46 by the component parts 46$^b$ and 46$^c$ of the shaft 46$^d$. The scraper 46$^a$ aids in the removal of the ice-cream from the scoop 46. In order to prevent the cone about to be delivered from becoming stuck to the magazine, there are provided, spring pressed pivoted members 43$^a$. These members 43$^a$ are arranged in a plane at right angles to the plane in which the pawls 43 are arranged. The members 43ª are so disposed as to be engaged by the upper edge of the sleeve 41, causing the said members to move on their pivots with the result that the particular cone to be delivered will be positively moved.

At the time the scoop 46 moves into a position for the discharge of the ice-cream within the same, an ejector or spoon 47 which lies in a recess in the interior of the scoop is actuated to discharge the charge of ice-cream within the scoop. The spoon 47 is pivotally mounted as at 47ª, and is provided with an arm 47ᵇ. A member 47ᶜ is provided with a cam-surface 47ᵈ. A flat spring 47ᵉ is fastened at one end at 47ᶠ, and its free end is in engagement with the free end of the arm 47ᵇ. As the scoop 46 moves to a discharging position, the spring 47ᵉ will function to cause the arm 47ᵇ to follow the cam-surface 47ᵈ, thus causing spoon 47 to move on its pivot. The ice-cream will have been formed substantially into the shape of a ball due to the rotation of the scoop 46 which passes up into the ice-cream in the nozzle 9, cutting out a hemispherical portion which is ejected by the release of the arm 47ᵇ; the scraper 46ª severing the ice-cream in the scoop from the interior surface thereof to facilitate the discharge of the ice-cream from the scoop. Upon the return of the scoop to its normal position, the spoon 47 will be moved to its normal position into the recess in the interior of the scoop. The gear 36 is provided with a clutch 48 which operates to rotate the gear when the shaft 33 moves in a counterclockwise direction and frees said gear upon return movement of the shaft.

In order to move the cone delivering arms into receiving and delivery position, a sprocket wheel 49 is mounted for rotation by the shaft 33 and is provided with a clutch 50 consisting of a ratchet 50ª and a spring pressed pawl 50ᵇ which operates when the shaft moves ½ of its ¼ revolution in a counter clock-wise direction. A chain or flexible member 51 encircles the sprocket wheel 49 and a sprocket wheel 52 which is carried by the inner end of a tubular shaft 53 which is mounted for rotation near the bottom wall 2 of the cabinet 1. The opposite end of the shaft 53 has attached thereto a bevel pinion 54 which meshes with a bevel pinion 55 secured to the lower end of a vertical shaft 56 which shaft carries at its upper end the cone delivery arms 57. A collar 58 surrounds the shaft 56 adjacent its upper end, and is provided with a lug 59 for engagement in a recess 59ª in a sleeve 60 which is connected at the upper end of a tubular shaft 61 which surrounds the shaft 56. Extending through the shaft 53 is a rod 62, one end of which has attached thereto a crank arm 63. A lever 64 is connected to the crank arm 63 and to a lever 65 which is connected to the shaft 33. The end of the rod 62 opposite that which is connected to the crank arm 63 is provided with a crank arm 63ª, which is connected to the shaft 61 so that said shaft may be elevated to cause the sleeve 60 to engage the collar 58 in such a manner as to cause the lug 59 to lock in the notch or recess 59ª and thereby hold the delivery arms against movement.

Figure 9:
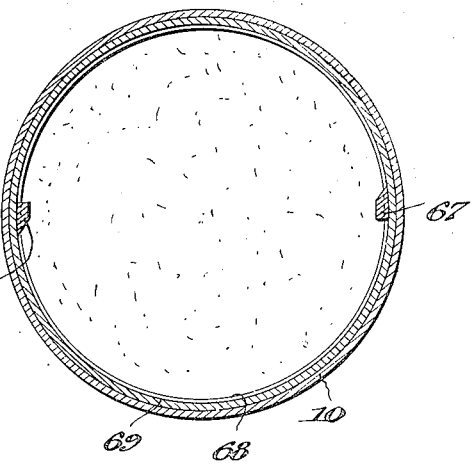
Figure 11:
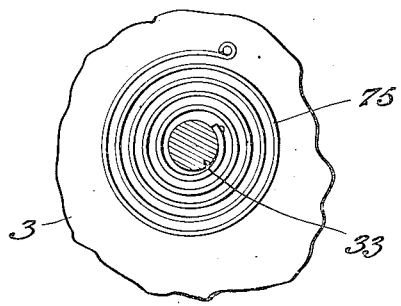
Figure 11 is a detail view.
Figure 10:
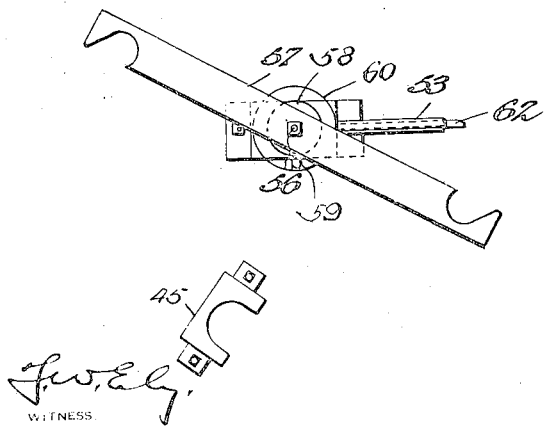
Figure 10 is a detail view illustrating the relative disposition of the cone delivering arm and the support for the cone.

In order to cause the mass of ice-cream in the device to exert equal pressure at its lower end, there is provided a scraper, designated in its entirety by the numeral 66, which comprises a plurality of vertical strips or bars 67 which have attached to their outer sides at spaced intervals, hoops or rings 68 which may be secured rigidly in any suitable manner. This scraper fits within the cylindrical container 69 for the ice-cream, and the upper ends of the strips or scraping elements are adapted to be received in the notches in the periphery of the plunger 25 while the rings 68 are received in annular grooves 70 formed in the container. As illustrated in Figures 8 and 9, the ice-cream container is provided with a removable bottom 71 and removable cover 72, which cover, is provided with an inwardly projecting head 73 which prevents the filling of the container entirely to the top. A volute spring 75 which has one extremity attached to the shaft 33 and its opposite extremity attached to wall 3 acts to return the crank 34 and shaft 33 to normal positions.

To operate, the cover 13 is swung around to open position upon the shaft 12, and when in such position, may be supported on any desirable supporting means in order to relieve the shaft of any bending stress whereupon the removable ice-cream container is inserted into the chamber within the insulated walls, it being understood that the bottom 71 and cover 72 are first removed. The container 69 rests on lugs 74 attached to the upper end of the funnel 9. The cover 13 is then swung to closed position thereby centering the plunger 25. The trip mechanism 29 is then operated to disengage the pinions 26 and 28 whereupon the crank 30 is manipulated to feed the plunger 25 downwardly and out of the chamber formed beneath the wall 17. As soon as the plunger contacts with the upper surface of the contents of the container, the trip mechanism 29 is released to permit the pinions 26 and 28 to properly mesh and the device is then ready for operation.

The operation is presently described. Upon clockwise rotation of the crank 34, the plunger 25 is moved downwardly to force cream into the scoop 46. Simultaneously with such movement of the crank, the lever 65 and arms 63 and 63ª are moved to raise notch 59ª into engagement with lug 59 to lock the arms 57 against any movement during this rotation of the shaft 33. The crank 34 is then released, the volute spring 75 rotating it counter-clockwise to its initial position. During such movement of the crank to its initial position, it being borne in mind that the crank only rotates a quarter of a revolution or ninety degrees, the following operations take place. During the first half of such latter movement of the crank, the scoop 46 is inverted and the contents thereof is deposited into the cone positioned directly beneath it supported by one of the arms 57; also during this half of the movement of the crank 34 the sleeve 41 is moved to permit a cone to be deposited into the holder 45, and the notch or recess 59ª and lug 59 are also disengaged. Upon further rotation of the crank 34 in a counter-clockwise direction, and during the last half of its movement, the clutch 50 operates to rotate the sprocket wheel 49 which in turn rotates the shaft 53 through the intervention of chain 51 and sprocket wheel 52. Movement of the shaft 53 causes rotation of pinions 54 and 55 and the movement of the arms 57 in a counter-clockwise direction to bring the filled cone through the slot 4 to a position outside the receptacle where it can be readily removed. The opposite arm 57 during such movement picks up another cone from the holder 45 and positions it beneath the scoop 46 ready to receive a deposit therefrom upon further operation of the device.

It will be understood that the clutches 35, 48 and 50 are arranged to operate their respective gears and sprockets, and when the shaft 33 moves in a counter clock wise direction it will be obvious that the clutch 35 will prevent the pinion 32 from rotating and in this manner the plunger 25 is fed in but one direction upon the operation of the machine in its entirety. The scraper 66 is designed to cut the mass of cream from the sides of the container and thus the mass will be advanced as an entirety thereby insuring a uniform pressure on that portion of the cream contained within the funnel shaped member 9 whereby a uniform packing of the cream within the scoop is secured. As illustrated in the drawing, the guide pins 19 of the indicator 20 by their travel in the slots in the cylinder 18 enable the user to readily determine the quantity of cream in the machine. This indicator also operates when the plunger is being elevated prior to re-charging the device to indicate to the operator when the plunger 25 has reached its uppermost limit of travel and is wholly contained within the chamber in the cover beneath the concavo-convex wall 17. In this manner it will be seen that any danger of the user endeavoring to swing the cover to open position while the plunger is in the container will be eliminated and danger of breakage avoided. A drain 76 is employed to permit the container 7 to be drained.

While in the foregoing, there has been shown and described, the preferred embodiment of this invention it is to be understood that certain minor changes in the construction, combination and arrangement of parts may be made without departing from the spirit and scope of the invention as claimed.

What is claimed as new is:—

1. In a dispensing apparatus, a refrigerated container, a receiver supporting and delivery mechanism beneath the container, means on the underside of the container for removing a portion of the container contents including a scoop which is positioned to receive said portion, and means for ejecting the said portion from the scoop into a receiver in the receiver supporting and delivery mechanism.

2. In a dispensing apparatus, a refrigerated container, a receiver supporting and delivery mechanism beneath the container, means on the underside of the container for removing a portion of the container contents including a scoop which is positioned to receive said portion, means for ejecting the said portion from the scoop into a receiver in the receiver supporting and delivery mechanism, and means for successively operating the removing means, the ejecting means and the receiver supporting means.

3. In a dispensing apparatus, a container, a receiver supporting and delivery mechanism beneath the container, dispensing mechanism including a scoop at the outlet of the container and ejecting means for removing a portion of the container contents and for depositing the same into a receiver in the receiver supporting and delivery mechanism, and means within the container for compressing its contents to force a portion thereof into the scoop.

4. In a dispensing apparatus, a container, a receiver supporting and delivery mechanism beneath the container, dispensing mechanism including a turnable scoop at the outlet of the container and ejecting means for removing a portion of the container contents and for depositing the same into a receiver in the receiver supporting and delivery mechanism, means within the container for compressing its contents to force a portion thereof into the scoop, and means for successively operating the compressing means, the dispensing mechanism, and the receiver supporting and delivery mechanism to fill a receiver and to move the same to delivery position.

5. In a dispensing apparatus, a container, a receiver supporting and delivery mechanism, dispensing mechanism including a turnable scoop at the outlet of the container and ejecting means for removing a portion of the container contents and for depositing the same into a receiver in the receiver supporting and delivery mechanism; means within the container for compressing its contents to force a portion thereof into the scoop, and mechanism for singly depositing receivers to the receiver supporting and delivery mechanism prior to the operation of the dispensing mechanism.

6. In a dispensing apparatus, a container, a receiver supporting and delivery mechanism, dispensing mechanism including a turnable scoop at the outlet of the container and ejecting means including a spoon within the scoop for removing a portion of the container contents and for depositing the same into a receiver in the receiver supporting and delivery mechanism; means within the container for compressing its contents to force a portion thereof into the scoop, mechanism for singly feeding receivers to the receiver supporting and delivery mechanism, and means for controlling the operation of the dispensing mechanism, receiver feeding mechanism and the receiver supporting and delivery mechanism sequentially.

7. In a dispensing apparatus, a refrigerated container having a reduced delivery opening at its lower end, dispensing mechanism including a turnable scoop operable in the said opening, a receiver supporting and delivery mechanism, means for packing a predetermined quantity of the contents of the container into the scoop, mechanism for singly feeding receivers to the receiver supporting and delivery mechanism, and means for ejecting the scoop contents including a spoon within the scoop which spoon is operable immediately the scoop is packed to discharge the contents thereof into a receiver.

8. In a dispensing apparatus, a refrigerated ice cream container having a restricted opening in its lower end, an ice-cream mould adapted to fit within the container, a scoop operable in the opening, a plunger for compressing the cream into the scoop, means within the mould for loosening the ice-cream from the side walls thereof to cause the mass to move in its entirety, a cone magazine, a cone receiving and delivery mechanism mounted beneath the magazine and adapted to be swung into receiving position beneath the scoop, means to successively pack the scoop, deliver the contents thereof into the cone, and move the cone supporting delivery apparatus into delivering position.

9. In a dispensing apparatus, a refrigerated container, an ice cream mould adapted to fit within the container, a plunger operable in the mould for forcing the cream downwardly means within the mould for loosening the cream from the side walls thereof to cause the mass to move in its entirety, means to support a cone beneath the container in a position to receive a predetermined quantity of cream and a scoop operable in the under side of the container for removing a quantity of cream from the container and delivering the same to the cone.

10. In a dispensing apparatus, a refrigerated container, an ice cream mould adapted to fit within the container, a plunger operable in the mould for forcing the cream downwardly means within the mould for loosening the cream from the side walls thereof to cause the mass to move in its entirety, means to support a cone beneath the container in a position to receive a predetermined quantity of cream, a scoop operable in the under side of the container for removing a quantity of cream from the container and delivering the same to the cone, and manually controlled means for successively operating the various elements of the apparatus.

In testimony whereof I have affixed my signature.

JOHN F. WALSH.